United States Patent
Santra et al.

(10) Patent No.: US 12,137,647 B2
(45) Date of Patent: Nov. 12, 2024

(54) PHLOEM-BASED DELIVERY OF THERAPEUTICS

(71) Applicant: UNIVERSITY OF CENTRAL FLORIDA RESEARCH FOUNDATION, INC., Orlando, FL (US)

(72) Inventors: Swadeshmukul Santra, Oviedo, FL (US); Swaminathan Rajaraman, Winter Park, FL (US); Woo Hyoung Lee, Oviedo, FL (US); Yunjun Xu, Oviedo, FL (US); Maria Gabriela Nogueira Campos, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 1764 days.

(21) Appl. No.: 16/104,752

(22) Filed: Aug. 17, 2018

(65) Prior Publication Data
US 2019/0082615 A1    Mar. 21, 2019

Related U.S. Application Data (60) Provisional application No. 62/547,055, filed on Aug. 17, 2017.

(51) Int. Cl.
| | |
|---|---|
| *A01G 7/06* | (2006.01) |
| *A01N 25/00* | (2006.01) |
| *A01N 25/04* | (2006.01) |
| *A01N 25/12* | (2006.01) |
| *A01N 25/28* | (2006.01) |
| *A01N 25/30* | (2006.01) |
| *A01N 25/34* | (2006.01) |
| *A01N 59/16* | (2006.01) |
| *A01N 65/36* | (2009.01) |

(52) U.S. Cl.
CPC ............... *A01G 7/06* (2013.01); *A01N 25/00* (2013.01); *A01N 25/04* (2013.01); *A01N 25/12* (2013.01); *A01N 25/28* (2013.01); *A01N 25/30* (2013.01); *A01N 25/34* (2013.01); *A01N 59/16* (2013.01); *A01N 65/36* (2013.01)

(58) Field of Classification Search
CPC .......... A01G 7/06; A01N 25/00; A01N 25/04; A01N 25/12; A01N 25/28; A01N 25/30; A01N 25/34; A01N 59/16; A01N 65/36
USPC ...................................................... 604/272
See application file for complete search history.

(56) References Cited

U.S. PATENT DOCUMENTS

| | | | |
|---|---|---|---|
| 3,964,482 A | 6/1976 | Gretsel et al. | |
| 9,700,221 B2 | 7/2017 | Rajaraman et al. | |
| 2011/0040236 A1* | 2/2011 | Isaacs | A61N 5/0624 604/20 |
| 2011/0319865 A1* | 12/2011 | Buss | A61M 5/425 604/173 |
| 2013/0338632 A1* | 12/2013 | Kaplan | A61M 5/158 604/173 |

OTHER PUBLICATIONS

Kundu, Avra et al., "Precision Vascular Delivery of Agrochemicals with Micromilled Microneedles (μMMNs)", Scientific Reports, 2019, 9:14008, 8 pages.
Allen, D.M., Photochemical Machining: from Manufacturing's Best Kept Secret to a $6 Billion Per Annum Rapid Manufacturing Process. CIRP Annals—Manufacturing Technology, 2004, 53(2): p. 559-72.
Choi, S.O., et al., Intracellular Protein Delivery and Gene Transfection by Electroporation Using a Microneedle Electrode Array. Small, 2012. 8(7): p. 1081-1091.
Davis, S.P., et al., Hollow metal microneedles for insulin delivery to diabetic rats. IEEE Transactions on Biomedical Engineering, 2005, 52(5): p. 909-915.
Davis, S.P., M.R. Prausnitz, and M.G. Allen. Fabrication and characterization of laser micromachined hollow microneedles. in IEEE Transducers Solid-State Sensors, Actuators and Microsystems, 12th International Conference on, 2003, pp. 1435-1438.
Novel delivery systems for transdermal and intradermal drug delivery, 2015, Editors Ryan F. Donnelly and Thakur Raghu Raj Singh, Wiley, 293 pages.
Gill, H.S. and M.R. Prausnitz, Coated microneedles for transdermal delivery, Journal of Controlled Release, 2007, 117 (2): p. 227-237.
Henry, S., et al., Microfabricated microneedles: A novel approach to transdermal drug delivery. Journal of Pharmaceutical Sciences, 1998, 87(8): p. 922-925.
Holmes, A.S., Laser fabrication and assembly processes for MEMS, in Laser Applications in Microelectronic and Optoelectronic Manufacturing Vi, M.C. Gower, et al., Editors, 2001. p. 297-306.
Ito, Y. et al., Evaluation of Self Dissolving Needles Containing Low Molecular Weight Heparin in Rats, Int. Jour. of Pharma., 2008, 349. p. 124-129.
Lumpp, J.K., L. Hua, and S. Al-Banna. Excimer laser assisted deposition of metal films on aluminum nitride, Advanced Applications of Lasers in Materials Processing/Broadband Optical Networks/Smart Pixels/Optical MEMs and Their Applications, IEEE/LEOS 1996 Summer Topical Meetings: 1996, 2 pages.

(Continued)

*Primary Examiner* — Michael B. Pallay
(74) *Attorney, Agent, or Firm* — Timothy H. Van Dyke; Wolter, Van Dyke, Davis, PLLC (57) ABSTRACT

Described herein are devices, systems and methods for delivering therapeutic compositions to plants. Specifically exemplified herein is a device comprising a plurality of microneedles for creating pores in an effective area of a target plant and then applying a second device loaded with the therapeutic composition. The microneedle device is designed to impart pores that allow for access of the therapeutic composition to the plant vascular system including phloem.

11 Claims, 9 Drawing Sheets

(56) References Cited

OTHER PUBLICATIONS

Wermeling, D.P., et al., Microneedles permit transdermal delivery of a skin-impermeant medication to humans. Proceedings of the National Academy of Sciences of the United States of America, 2008, 105(6): pp. 2058-2063.

Malek, C.G.K., Laser processing for bio-microfluidics applications (part I). Analytical and Bioanalytical Chemistry, 2006. 385(8): p. 1351-1361.

Malek, C.G.K., Laser processing for bio-microfluidics applications (part II). Analytical and Bioanalytical Chemistry, 2006, 385(8): pp. 1362-1369.

McAllister, D.V., et al., Microfabricated needles for transdermal delivery of macromolecules and nanoparticles: Fabrication methods and transport studies. Proceedings of the National Academy of Sciences of the United States of America, 2003, 100(24): pp. 13755-13760.

J.A. Matriano, M. Cormier, J. Johnson, W.A. Young, M. Buttery, K. Nyam, p. E. Daddona, Macroflux microprojection array patch technology: a new and efficient approach for intracutaneous immunization, Pharm. Res. 19 (2002) pp. 63-70.

Norman, J.J., et al., Hollow microneedles for intradermal injection fabricated by sacrificial micromolding and selective electrodeposition. Biomedical Microdevices, 2013, 15(2): pp. 203-210.

Ota, M., H. Okano, and M. Yoshida, Manipulation of micro solid particles and induced flows in water by laser rradiation. Journal of Thermal Science, 2007, 16(2): pp. 176-180.

Prausnitz, M.R., Microneedles for transdermal drug delivery. Advanced Drug Delivery Reviews, 2004, 56(5): pp. 581-587.

Rajaraman, S., et al., Micromachined three-dimensional electrode arrays for transcutaneous nerve tracking. Journal of Micromechanics and Microengineering, 2011, 21(8), 13 pages.

Sullivan, S.P., N. Murthy, and M.R. Prausnitz, Minimally invasive protein delivery with rapidly dissolving polymer microneedles. Advanced Materials, 2008. 20(5): p. 933-938.

Tucker, A.W. and M. Birnbaum, Laser chemical etching of vias in GaAs. Electron Device Letters, IEEE, 1983, 4(2): pp. 39-41.

Wang, P.M., et al., Precise microinjection into skin using hollow microneedles. Journal of Investigative Dermatology, 2006, 126(5): pp. 1080-1087.

\* cited by examiner

PHLOEM-BASED DELIVERY OF THERAPEUTICS

BACKGROUND

Citrus greening, Huanglongbing (HLB) disease is caused by a bacteria, *Candidatus Liberibacter asiaticus* (CLas), which infects trees causing an overwhelming disruption of citrus production, and challenging devastation to agricultural crops. The HLB causing bacteria, CLas is phloem limited and vectored by the Asian citrus psyllids (ACPs). As the disease progress, callous (an insoluble composite biomaterial) deposition and phloem necrosis significantly restricts movement of water, glucose and other plant nutrients. This causes severe damage to root system. Moreover, CLas forms biofilm in clogged phloem tissue. Large amount of starch accumulation in leaves disrupts chloroplast. All these factors contribute to overall tree health decline, resulting loss in fruit quality and yield.

Currently, the most effective method to prevent the spread of this disease, which is spread by Asian citrus psyllid feeding on phloem on the trees directly effecting the nutrients circulating through the tree, is to cut down infected trees, further adding to the agricultural dismay in citrus crops.

Current methods of delivering of therapeutic compositions to plants is ineffective to treat many plant infections.

BRIEF DESCRIPTION OF DRAWINGS

These and other features, aspects, and advantages of the present disclosure will become better understood with reference to the following description and appended claims, and accompanying drawings where:

FIG. 7D: provides a graph showing a 4× increase in uptake of Zn quantum dot when compared to a control citrus leaf with no MN treatment.

FIG. 8A: provides a photograph of a fully packaged roller device.

FIG. 8B: provides a photograph of a microneedle array that is attached to the roller shown in FIG. 8A.

FIG. 8C: provides an SEM micrograph of a portion of the microneedle array shown in FIG. 8B.

FIG. 8D: provides an SEM micrograph of one of the needles of the microneedle array shown in FIG. 8B illustrating a "trident" shape.

FIG. 9A: provides a photograph of an application of the MN roller device shown in FIG. 8A onto a trunk of a citrus tree.

FIG. 9B: provides a photograph of a close up of the view shown in FIG. 9A.

FIG. 10: provides SEM images (500×) of citrus seedling cross sections exposed to 0, 5, 15 and 40 watts (W) of sonication.

FIG. 11: Biofilm treatment progression with 5 W sonication at 20 Khz.

FIG. 12: Sketches of microneedle penetration device (left) and patch wrap device (right). The inner surface of the penetration device is flexible, and wet-pads will be secured by Velcro. Both devices are magnetic driven.

DETAILED DESCRIPTION

The present disclosure is based on the discovery that therapeutic cargoes (e.g. pesticides, drugs, therapeutics, macro- and micro-nutrients) can be delivered to hidden plant tissues (such as cambium, phloem and xylem) in a minimally invasive manner to impart benefits to the plants. Cargoes delivered by conventional foliar or soil drench application methods have very limited access to the said tissue systems due to protective skin-like barrier. Using minimally-invasive microneedle (solid and/or hollow) roller, therapeutic cargo can be delivered efficiently directly to the target tissues.

Accordingly, in one embodiment, there is provided a method for delivering therapeutic compositions to a plant. The method involves the step of applying a microneedle device including a surface having one or more microneedles to a portion of the crop plant (i.e., an effective area). The effective area may include the stem of the crop plant, in one non-limiting embodiment. The microneedle device may be associated with the stem of the crop plant, such that the microneedles pierce a portion of the stem adjacent thereto, creating pores in the stem of the crop plant. In one non-limiting embodiment the one or more microneedles may penetrate the effective area of the plant between 1-5 mm deep into the phloem tissue. In another non-limiting embodiment, the one or more microneedles may penetrate the effective area of the plant between 2-4 mm deep into the phloem tissue.

Another embodiment pertains to a system for delivering a therapeutic composition to an interior tissue of a crop plant. The system includes a first device comprising a plurality of microneedles for application to an effective area of the crop plant to introduce pores into the effective area of the crop plant; and a second device comprising an amount of the therapeutic composition, wherein administration of the therapeutic composition to the pores of the crop plant delivers the therapeutic composition to interior tissues of the crop plant.

A further embodiment pertains to a device for delivering a therapeutic composition to an interior tissue of a crop plant. The device includes a first and second opposing members configured to engage the crop plant when brought together. The first and second opposing members are arcuate such that each define an interior curved surface. The device also includes a first and second microneedle array disposed on the interior curved surface of each of the first and second opposing members, respectively.

One implementation of certain embodiments disclosed herein, pertain to the ability to treat plant infections (such as HLB). Regarding HLB or other biofilm producing bacteria, it has been discovered that to kill CLas, bactericides should be delivered to phloem tissue above their minimum bacterial inhibition concentration (MBIC) and should interact with bacteria in the biofilm. If planktonic cells are only killed but biofilm is not treated, HLB management with bactericides will be extremely challenging. Furthermore, CLas will develop resistance if treated with bactericides below the MBIC level. This is the limitation of any traditional chemical bactericides including antibiotics and metal based bactericides.

According to one aspect, disclosed embodiments provide an effective solution for treating HLB infection. Current problems in treating HLB disease in infected trees involves a difficulty in effectively delivering the treatment to the plant. In order to be effective against HLB, bactericide needs to cross multiple layers of cellular barriers to reach the phloem tissue. It has been discovered that the currently used methods of spraying the plant with a bactericide (e.g., Zinkicide) have limited efficacy due to the physical barrier of the plant which prevents the bactericide from fully entering the plant. Physical barriers such as leaf cuticle and bark prevent direct access to the plant for effective treatment. Standard bactericide application methods such as foliar spray, soil drench or trunk injection do not deliver bactericides directly to the phloem tissue. Aggressive application of bactericide through trunk injection often leads to undesired phytotoxicity in particular for copper based bactericides. Furthermore, bactericide residue in fruits may pose serious concerns in particular for antibiotics. All these factors present an unprecedented challenge to manage HLB infected trees at this moment.

Certain embodiments of the invention include a treatment system and method that provides direct access of the bactericide treatment to the phloem of the crop plant, gaining direct access to the nutrient pathway of the crop plant. Because the phloem is buried under multiple cell layers, it is not easily accessible. Systemic delivery to the roots, leaves and stems is essential in adequately treating infected plants. In certain embodiments herein, treatment of an crop plant infected by a biofilm producing organism is possible by way of microneedle and shockwave treatment.

In certain embodiments, treatment compositions include one or more agents for treating a plant infected with a plant pathogen or pest. The treatment composition can include bactericides, pesticides, fungicides, etc. Novel bactericides including a microbubble-based bactericide may be used to treat the crop plant. In still other embodiments, zinc (Zn) based bactericides may be used including Zinkicide or T-SOL, or any other known bactericide treatment used to treat HLB infected crop plants.

In another embodiment, a therapeutic composition is applied to the effective area for plant treatment. In one non-limiting embodiment, a substrate containing the therapeutic composition is applied to the effective area, such that the therapeutic composition can enter the phloem of the crop plant through the microneedle pores. In a further non-limiting embodiment, the microneedles may be included on a microneedle roller, and the substrate containing bactericide may include a wrap or bandage soaked in the therapeutic composition. The combination of the microneedle roller delivery system with crop plant bandage may create thousands of high-surface area holes on the crop plant stem or trunk area, allowing the therapeutic composition to travel through to the phloem. In one specific embodiment, the therapeutic composition comprises a treatment composition. In an even more specific embodiment, the treatment composition comprises a bactericide. A certain class of bactericides include Zn metal, which is significantly depleted from phloem tissue of HLB infected crop plants, and consequently, the microneedle roller delivery system with Zn based bactericide described herein serves to replenish the Zn metal in the phloem tissue of the infected crop plant.

In another embodiment, the system may include a device comprising one or more microneedles and a pressurized component to deliver treatment composition to the crop plant. The microneedles may be associated with an effective area of the crop plant, in one non-limiting embodiment, the effective area may include a stem or a bark, such that the microneedles pierce the stem or bark adjacent thereto, creating pores in the stem or bark of the crop plant. The pressurized component may overcome positive pressure in the phloem to effectively deliver the treatment composition to the crop plant.

The pressurized component may include one or more valves, which may control the delivery of the treatment composition in a pressurized manner. In a further non-limiting embodiment, the pressurized component may include the BRANDT® enTREE® pre-pressurized injection system. The pressurized component delivery system may prevent clogging at the injection point on the crop plant. The pressurized component allows for a decreased delivery time for treatment of the crop plant. In some non-limiting embodiments, delivery time may be between 20-40 minutes injection time. In further non-limiting embodiments, delivery time may include 30 minutes injection time.

In a further, non-limiting embodiment, the microneedles may be provided on a first flexible substrate. The first flexible substrate may be configured to wrap around a portion of the crop plant at an effective are. Further, a second flexible substrate may be configured to wrap around the first flexible substrate such that therapeutic composition in the second flexible substrate travels through the first flexible substrate to the effective area. In one specific embodiment, the microneedles are hollow and the therapeutic composition travels from the second flexible substrate though the hollow microneedles.

In another alternative, a plurality of pores are created in the crop plant at an effective area by a first device comprising a plurality of microneedles, and then a second device comprising a flexible substrate and an amount of therapeutic composition is wrapped around the effective are. Therapeutic composition in the second flexible substrate enters the pores and accesses the phloem of the plant.

In yet a further embodiment, the system may include ultrasound shock wave technology (USSW) to effectively treat the infected crop plants or otherwise assist in delivery of the therapeutic composition. In some non-limiting embodiments herein, the USSW may be coupled to the microneedle device, such that the combination microneedle-USSW system may deliver treatment composition to the phloem of the crop plant. CLas and other biofilm forming organisms create a biofilm that clogs phloem tissue. Use of USSW will compromise the bacterial biofilm integrity in the phloem, by way of the shock wave which will penetrate the tissue of the of the crop plant. Disintegration of bacterial biofilm in the phloem creates a channel for water percolation to allow bactericides to be delivered to treat biofilm. The USSW provides pulses to enhance delivery of the treatment composition to the crop plant. The intensity of the pulses can be adjusted, and in some non-limiting embodiments, optimized intensity and surface coverage can selectively activate the phloem and avoid entering the xylem to decrease the potential for inhibiting water flow in the xylem.

Definitions

All technical and scientific terms used herein, unless defined herein, are intended to have the same meaning as commonly understood by one of ordinary skill in the art. The techniques employed herein are also those that are known to one of ordinary skill in the art, unless stated otherwise.

The term "crop plants" as used herein means any kind of agricultural crop, including but not limited to fruit plants, vegetables, cereals, rice, legumes, cotton, tobacco, nuts, herbs, spices, and ornamentals. In one embodiment, the crop plant is a fruit bearing tree, such as citrus tree. In other specific embodiments, the crop plant is *vitis vinerfera*, or a palm tree.

The term "target plants" are plants onto which the device and/or method is applied.

The term "effective area" includes the area of the plant on which the device or method is applied. In some non-limiting examples, the effective area may include any portion of the plant that allows access to the phloem. In one non-limiting embodiment, the effective area may include the plant stem.

The term "microneedle array" as used herein refers to a substrate or structure having a plurality of microneedles spaced apart from each other. In specific examples, a microneedle array has a plurality of microneedles spaced apart in a predetermined pattern.

The term "therapeutic composition" as used herein refers to a composition that comprises one or more agents beneficial to a target plant. The one or more agents may include but are not limited to pesticides, bactericides, fungicides, drugs, therapeutics, macronutrients or micronutrients. A treatment composition is one example of a therapeutic composition.

The term "treatment composition" as used herein is a composition that includes one or more agents for treating plant pathogens. Such agents may include zinc (Zn) based bactericides such as Zinkicide or T-SOL, in non-limiting embodiments, or any other known bactericide treatment used to treat infected crop plants, or more specifically, HLB-infected crop plants, in non-limiting embodiments.

EXAMPLES

Example 1

Delivery of a Therapeutic Composition to *Citrus*
Materials and Methods

The system and method embodiments described herein include, for example, a first substrate, the microneedle device, that rolls the microneedles onto the effective area of the plant, whereinafter a second substrate is applied to the effective area where pores are formed by the microneedles, and lastly the area is zapped, or treated with the treatment composition by way of pressurized injection, or by USSW, for example, to deliver the treatment to the phloem. Methods and materials are described herein for experiments conducted with the phloem based delivery of treatments to crop plants.

The experiments described below were conducted in greenhouse with young (<1 year old) *Citrus macrophylla* and 'Hamlin' sweet orange (*Citrus sinensis*) seedlings already infected with CLas. In these experiments, two methods of delivery were compared, RWZ (roll-wrap-zap, wherein microneedles are rolled onto the effective area, a second substrate with bactericide is applied to the area, and the area is "zapped" with a shockwave to further penetrate the plant tissue and effectively deliver the plant treatment composition.

1) RWZ-Based Phloem Delivery Method Involving Microneedle Rolled Around Stems of the Citrus Plants.

Figures 1A, 1B, 1C, 1D, 1E, 1F, 1G, 1H:
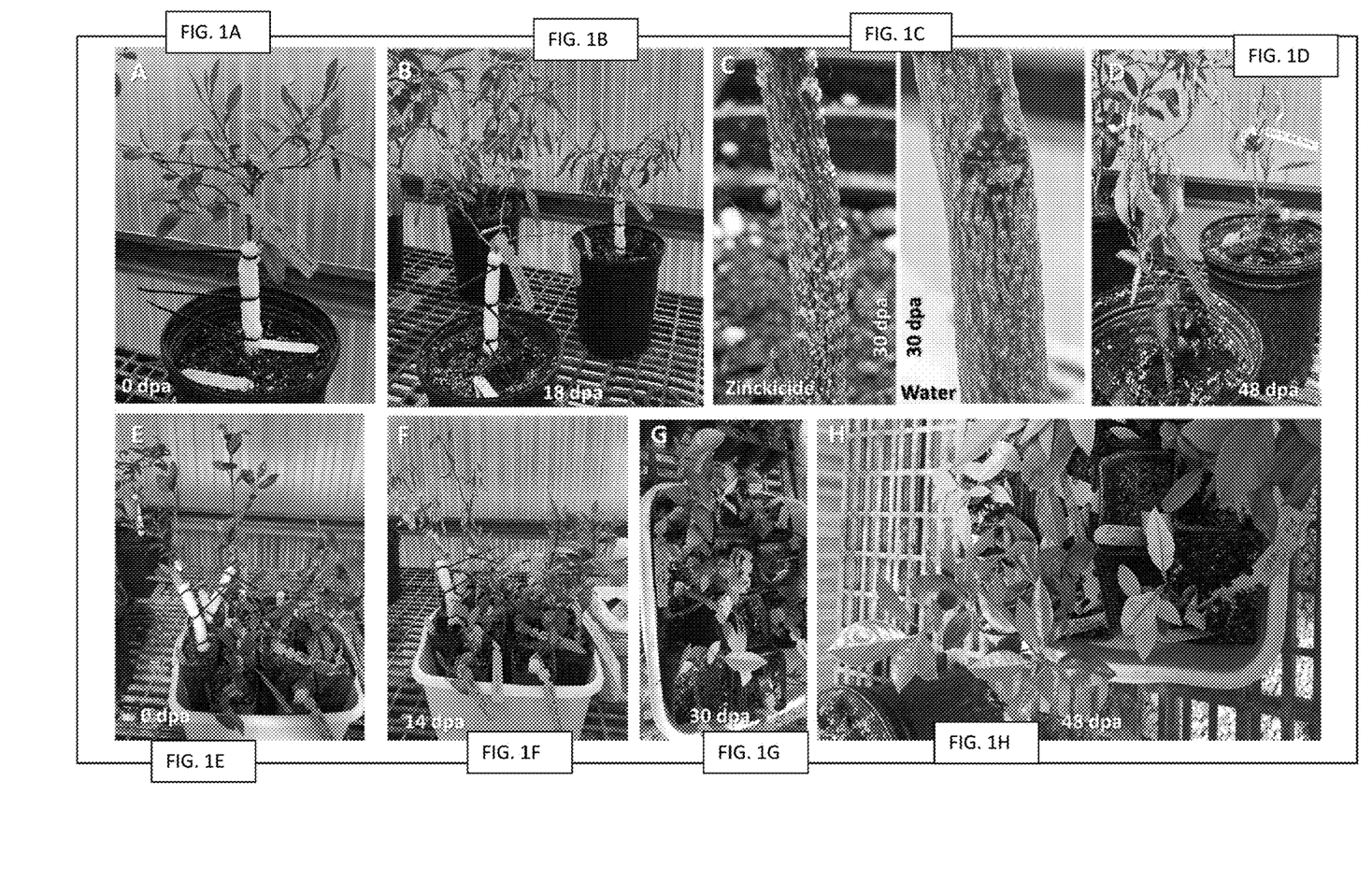
FIG. 1A: provides a photo showing RWZ and Zinkicide applied to CLas infected *Citrus macrophylla* seedling at 0 day-post-application (dpa)
FIG. 1B: provides a photo a treated tree from FIG. 1A at 18 dpa showing wilting of leaves.
FIG. 1C: provides a photo of the stem of plant from B and microneedle pits filled with white Zinkicide material visible at 30 dpa (left) and healing microneedle wounds on the stem of the water treated and alive control plant at 30 dpa (right).
FIG. 1D: provides a photo showing new axillary sprouts in RWZ Zinkizide-treated plants by 48 dpa.
FIG. 1E: provides a photo showing CLas infected Hamlin sweet orange treated with RWZ and Zinkicide (left, wrapped with white cloth) and at right, a few plants treated with Zinkicide through soil drench at 0 dpa (smaller seedlings without cloth).
FIG. 1F: provides a photo showing plants treated with Zinkicide from FIG. 1E showing two Hamlin plants treated with RWZ and Zinkicide and healthy looking soil drench applied plants at 14 dpa.
FIG. 1G: provides a photo showing healthy looking plants applied with Zinkicide through soil drench at 30 dpa.
FIG. 1H: provides a photo showing healthy looking plants applied with Zinkicide through soild drench at 48 dpa.
Figure 2A:
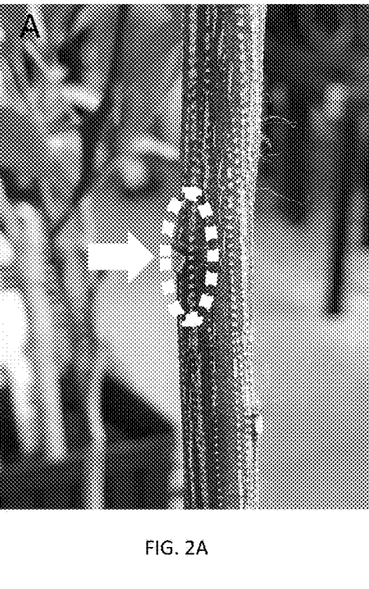
FIG. 2A: provides a photograph showing an application area of a MN roller on a citrus tree in the greenhouse—(A) highlighted area of the tree when MN roller is applied.
Figure 2B:
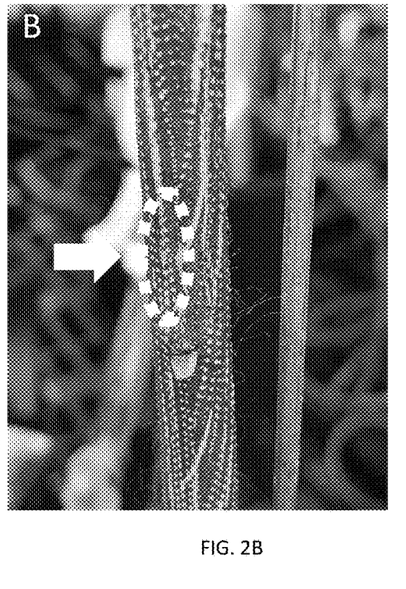
FIG. 2B: provides a photograph showing an application area of a MN roller on a citrus tree in the greenhouse one month after roller application where the highlighted area depicts the full healing of the micro-holes created by the roller
Figure 3A:
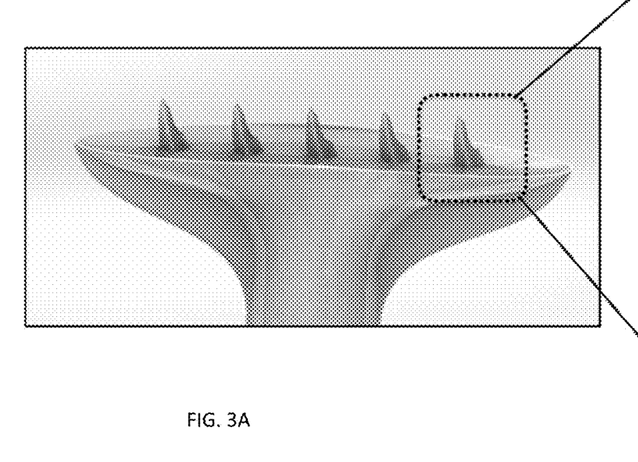
FIG. 3A: shows a perspective view of a printed microneedle device.
Figure 3B:
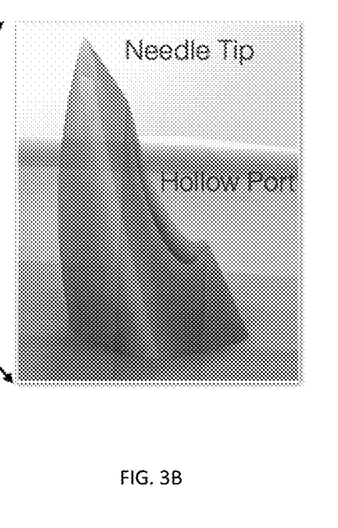
FIG. 3B: shows a perspective close up side view of a microneedle on the device shown in FIG. 3A.
Figure 4A:
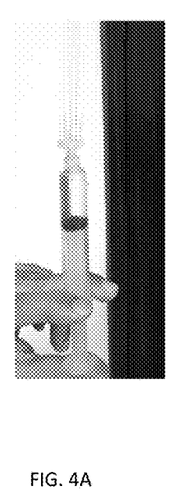
FIG. 4A: provides a photograph of a device with hollow MNs that were 3D printed and attached to a syringe component.
Figure 4B:
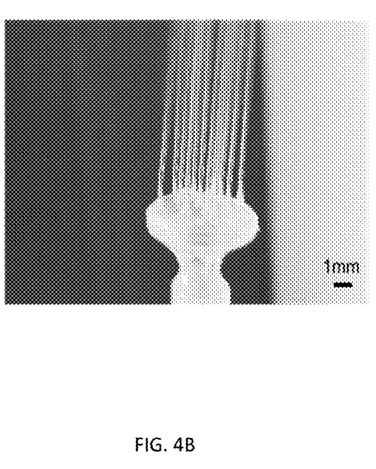
FIG. 4B: provides a photograph of the device in FIG. 4A showing flow of DI water to demonstrate that the hollow ports (~500 µm in diameter) are fully open and allow fluid flow through them.
Figure 4C:
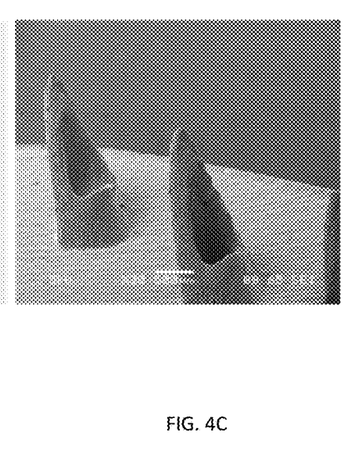
FIG. 4C: provides SEM imaging (right) that depicts the size of the hollow MNs (base diameter: 500 µm; hollow ports: slightly larger than 500 µm and height ~1000 µm).
Figure 5A:
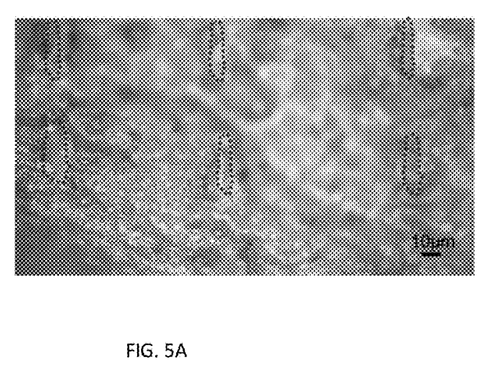
FIG. 5A: provides an optical micrograph of the front side (pierced) of citrus stem tissue. The highlighted dotted areas on the left depict piercing of the outer layers of plant skin successfully and in a repeated fashion by the hollow MNs.
Figure 5B:
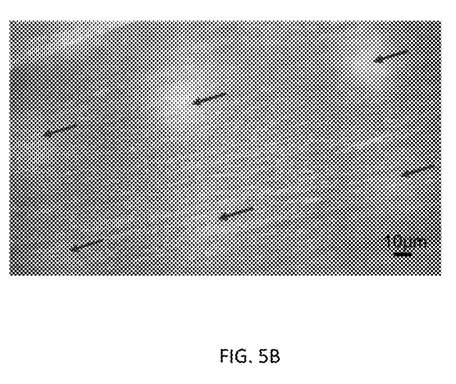
FIG. 5B: provides an optical micrograph of the backside (unpierced) of citrus stem tissue. The arrow marks on the right indicate no piercing on the corresponding bottomside of the plant tissue.
Figure 6:
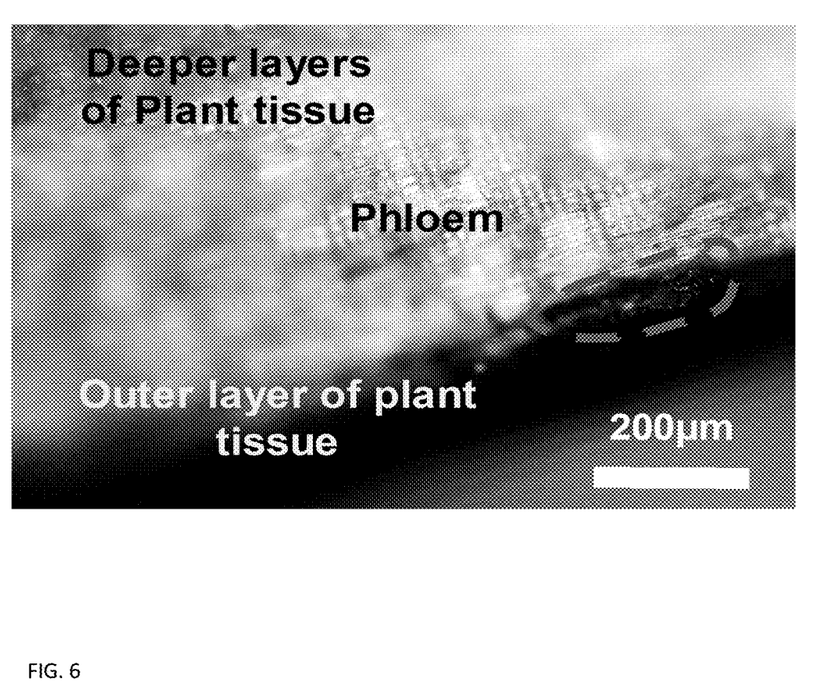
FIG. 6: provides an optical micrograph of dye injection through the hollow port into the outer layer of plant tissue indicating controlled delivery of dye into the phloem area and no dye in the deeper areas of plant tissue.
Figure 7A:
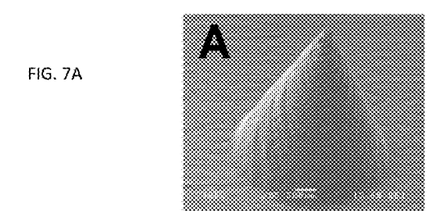
FIG. 7A: provides an optical micrograph of a single needle of a 10×10 3D printed microneedle design.
Figure 7B:
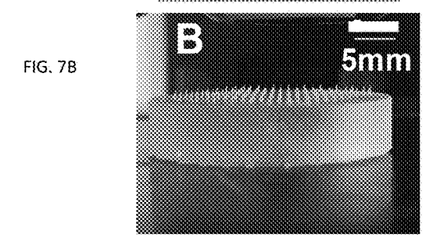
FIG. 7B: provides a side view of a device with a 10×10 3D printed microneedle design.
Figure 7C:
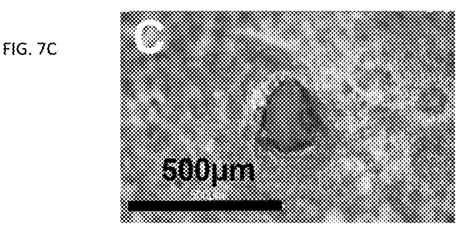
FIG. 7C: provides a photograph of a single leaf piercing using the device shown in FIG. 7B.
Figure 7D:
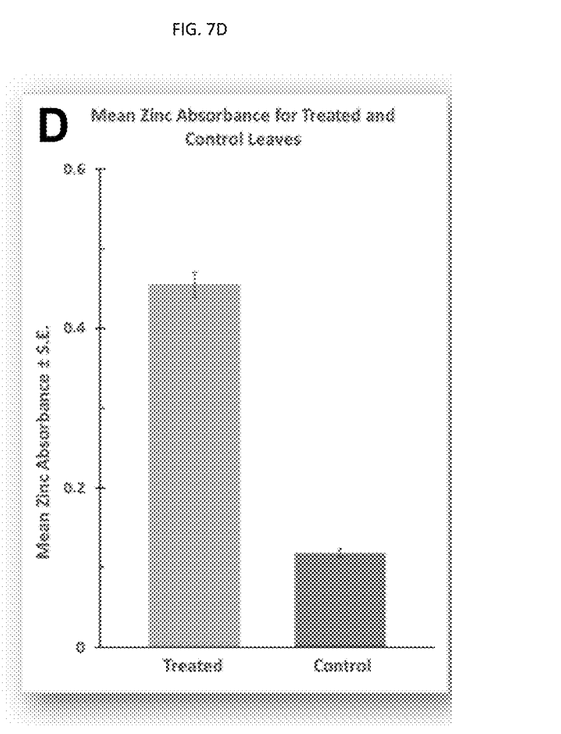
Figure 8A:
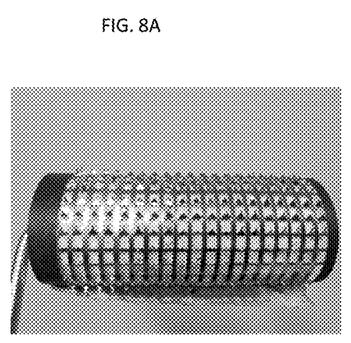
Figure 8B:
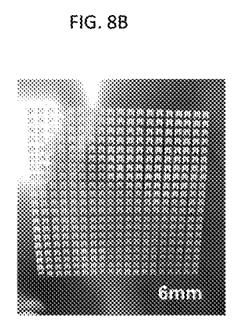
Figure 8C:
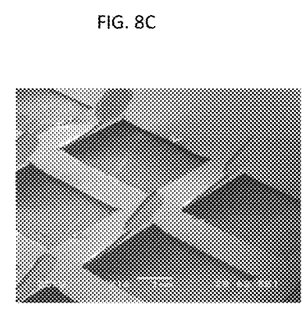
Figure 8D:
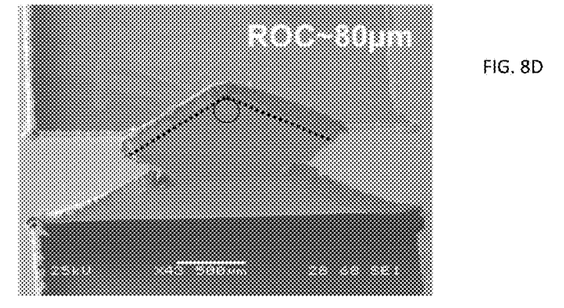
Figure 9A:
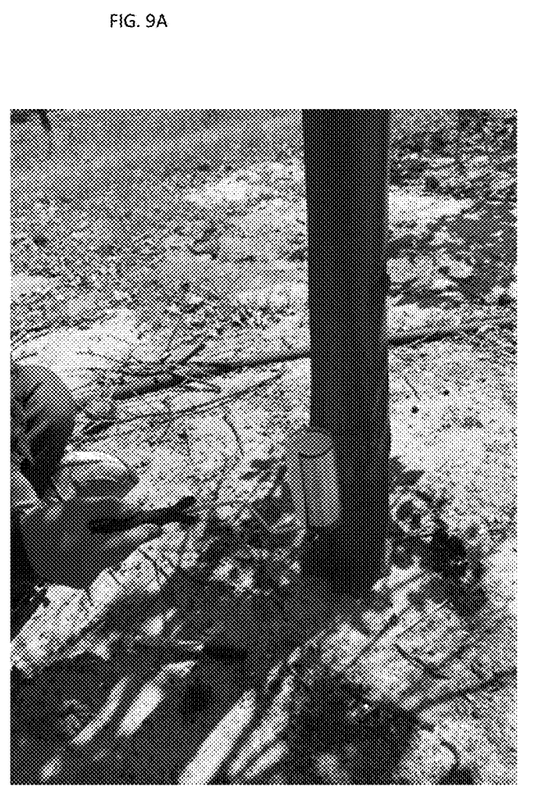
Figure 9B:
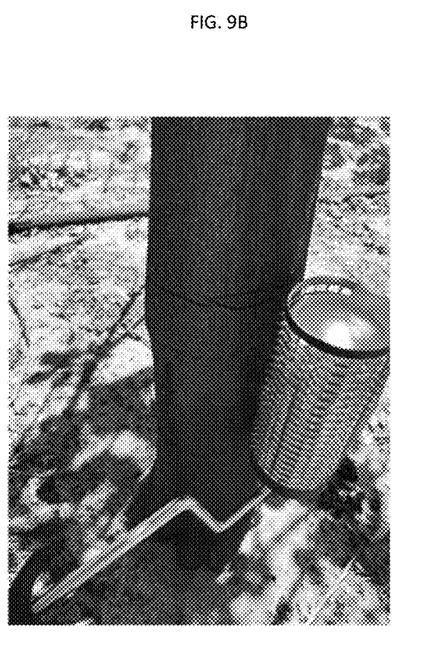

In one experiment, one healthy and two CLas infected *C. macrophylla* and two CLas infected Hamlin sweet orange plants were treated (FIGS. 1A and E). A microneedle roller was applied on 10-13 cm×5-6 mm diameter area of each plant. The microneedle-treated area was wrapped immediately with microfiber cloth presoaked with 2000 ppm Zinkicide TMN110 and tied with plastic Zip ties.

First visible stress sign (wilting) was observed on RWZ and Zinkicide applied to CLas infected Hamlin plants right at the same day after the second round of Zinkicide application at 9 days-post-application (dpa). These plants continued to decline and were completely wilted, with leaves dried and mummified that stayed on the plants by 14 dpa (FIG. 1F). However, similar stress signs were delayed and were not observed on *C. macrophylla* counterparts until 18 dpa (FIG. 1B). Nevertheless, all RWZ and Zinkicide applied plants appeared dry by 20 dpa whereas RWZ water treated *C. macrophylla* control plants continued to grow without any stress signs up until about 2 months post application. The apparently dry *C. macrophylla* plants showed microneedle pits filled with white exudates that appeared to be solidified Zinkicide (FIG. 1C). By 30 dpa, new axillary sprouts near the soil line were established in these Zinkicide-treated plants, and new sprouts continued to grow with healthy appearance (FIG. 1D).

2) Zinkicide Formulation Directly Applied Through Soil Drench.

In this delivery method, 15 ml of 2000 ppm Zinkicide TMN110 were applied directly through soil drench around the stems (FIG. 1E-F). Second round of Zinkicide application was repeated 9 days later.

Interestingly, none of the plants that were treated with 2000 ppm Zinkicide through soil drench showed any stress, thus, the third Zinkicide application was repeated only to the soil drench applied plants. Thus far, none of the plants that treated with Zinkicide through soil drench show any stress, and continue to grow without any visible differences as compared to the water-treated control counterparts (FIG. 1E-H).

Overall, these results clearly indicate that RWZ (microneedle) method is effective in delivering the Zinkicide to the plant phloem, and that 2000 ppm application rate of this material had some toxic effects for the young citrus plants. Nevertheless, Zinkicide delivered at this high concentration was either not translocated to root tissues or did not impair root health and function, because new, abundant and normal looking sprouts from these plants are continuing to grow in our greenhouse. No visible symptoms of HLB are present in these new leaves established from the new sprouts.

Example 2

Fabrication and Testing of Hollow Microneedles for Delivery to Phloem

An assessment of the fabrication and micro/nanoparticle (drug-like compounds) delivery aspects of hollow microneedles (hMNs) and solid microneedles (MNs) was performed in different formats in plants. 3-D printing was utilized as a technological platform for the development of hollow microneedles, since it provides a cost effective ability to rapidly translate from 3-D design to a manufactured device. A resin-based hollow microneedle array was designed (utilizing Solid Works) 3-D printing with the following two dimensions for the perfusion of test compounds: (1) row of 5 hMNs (base diameter 1.2 mm and a pitch of 3 mm) and heights of 2 mm, 2.5 mm and 3 mm with hollow ports that are approximately 500 μm wide (FIG. 2); (2) an array format of hMNs with 13 needles (base diameter 1.2 mm and a pitch of 3 mm) arranged in rows of 2 or 3 needles with a height of 2.5 mm and hollow ports of approximately 500 μm width. The hMNs were tested for hollow port yield with a fluid flow test, microneedle sharpness utilizing optical and scanning electron micrography (SEM), piercing of plant tissue and the delivery of model dye (gentian violet) to the phloem layer in citrus plant seedling. As depicted in FIG. 4, the hMNs yielded a repeatable 100% of port openings (N=12) as demonstrated by the flow of DI water through these ports, excellent and repeatable abilities to pierce the outer layers of plant tissue (FIG. 5) and the successful delivery of gentian violet to the plant phloem as depicted in the cross section of plant tissue (FIG. 6). Additionally characterized were the hollow MNs with SEM to demonstrate the sharpness of the tips, which were measured to be approximately 20 μm. It was ascertained that such tip sharpness should be sufficient to pierce the epidermal layer of skin and this metric was found to successfully pierce outer layers of the plant seedling.

These results demonstrate the ability of the hMNs to pierce the outer layers of plant tissue and the ability to deliver dye into inner layers of the plant. 3-D printing is an excellent technological platform to demonstrate feasibility of an hMN approach and to provide rapid feedback to the design, development and testing of hollow microneedles.

Example 3

Fabrication and Testing of Solid Microneedles

Two types of solid microneedles were developed for penetration of plant tissue. The 3D printed hollow MNs platform was expanded with the design and development of 3D printed solid MNs for the penetration of leaves to deliver test nanoparticles that modeled drugs into leaves for a similar treatment of citrus diseases.

A 10×10 MN base design with 250 μm base diameter and 1 mm height was designed with 3D CAD and printed using a 3D printer. Multiple citrus leaves (N=30) were treated with these MNs at the top and bottom of the leaf structure and 200 μl of test nanoparticle (N-Acetyl Cysteine coated ZnS:Mn quantum dot) was pipetted into the treated areas. A similar number of control leaves were additionally treated with the quantum dot nanoparticles. Following a 24-hour growth procedure and standard digestion of the leaves, the Zinc content was measured using Atomic Absorption Spectroscopy (AAS) and found to be four times (FIG. 7) in the MN treated leaves as opposed to the controls without MN treatment depicting the efficient creation of micron-scale pathways in leaves for the delivery of drug-like particles for disease treatment. It further depicts uptake of metallic nanoparticles through these pathways and a possibility to design and develop nanoparticle-based bactericide for the treatment of citrus diseases.

With the successful development of 3D printed MNs for treatment of plant tissue (young sapling) and leaves, solid MNs were developed for the treatment of trees. 3D printing serves as an excellent technology for the rapid development of MNs for this application. However, treatment of tree barks with the aim of producing entry pathways for bactericides is a different problem. Metallic microneedles are far more suitable for this application since they have a higher yield modulus than polymer/resin based microneedles and hence are stronger for the intended application. MNs were designed to be in the form of a sheet that can be micromachined and wrapped in a roller format for ease of application on a tree trunk. Micromilling was chosen as the technology for implementing the micromachining of stainless steel which was chosen as the metal for its inherent strength, high Young's Modulus, biocompatibility and ease of handling. A "trident" design was implemented in CAD and a 19×20 array of trident (taper up to an apex) MNs were micromilled. The size of an individual trident was 3 mm by 4 mm with each trident having a height of approximately 3 mm. All 380 MNs were manually pushed through and the MN sheet was rolled around a commercial roller and placed into position with an adhesive (FIG. 8). The thickness of the stainless steel sheet used in the micromilling process was approximately 100 μm. The individual MNs were imaged using a SEM for design fidelity and to evaluate the sharpness of the microneedle tips (measured to have a radius of curvature of ~80 μm). Excellent repeatability in features for the fabricated MNs was observed (FIG. 8).

Such a solid microneedle roller was successfully implemented in the field for bactericide (Zinkicide) uptake. Three different citrus trees (FIG. 9) in two groves in Florida were subject to a treatment by the solid microneedle roller, followed by Zinkicide treatment with a soaked wrap that was tied around the tree. The initial results were promising with no phytotoxicity observed and the uptake the bactericide can be measured.

Those skilled in the art will appreciate that a microneedle array may be manufactured by any one of a number of fabrication techniques known in the art, including but not limited to, molding, metal cutting, 3-D printing, CNC cutting, among others.

Example 4

Figure 10:
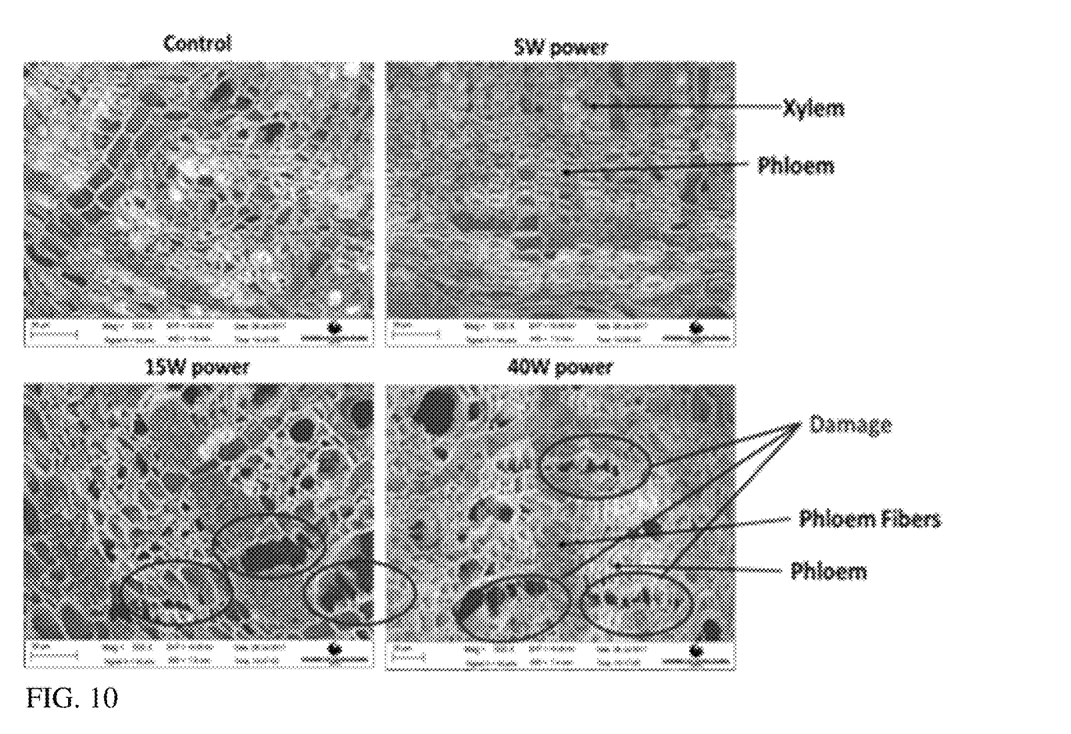

Implementation of Ultrasound Technology for Treating Huanglongbing (HLB) Affected Citrus Plants To evaluate the feasibility of using ultrasound for improving bactericides delivery to the phloem of HLB affected plants, a preliminary test was conducted to observe how ultrasound can affect the tissues on citrus plants. 1 cm sections were cut from 6-9 month old sour orange seedlings and transferred to a centrifuge tube with 25 mL of DI water. The samples were sonicated for 30 mins with 10 second pulses and 30 seconds of rest. The frequency was fixed at 20 Khz and electrical power was varied between 5, 15, and 40 watts. After sonication, 40 μm thick cross sections of the samples were evaluated using SEM. FIG. 10 shows the effect of ultrasound power on phloem tissue integrity. The phloem of the control sample (without sonication) and the sample with 5 W sonication displayed no noticeable damage. Sonication at 15 W and 40 W power show damage localized to the phloem and phloem fibers. These soft tissues seem more susceptible to sonication which is ideal considering the goal is to assist is delivering bactericides to the phloem. Furthermore, this experiment shows that 15 and 40 W powers damage to the plant. Therefore, 5 W of power or less would be appropriate citrus plant application.

Figure 11:
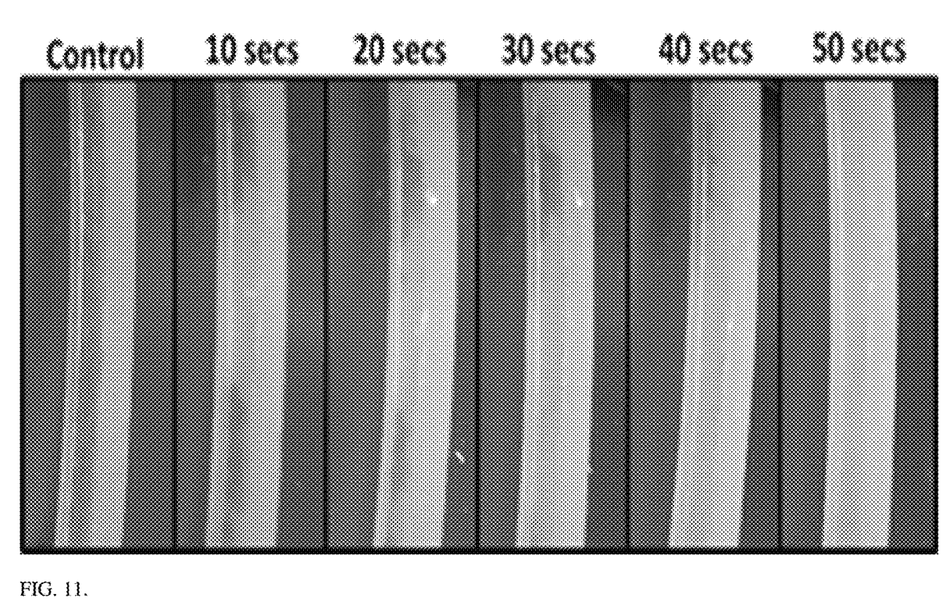

The ability of ultrasound to dislodge biofilms was also evaluated through a concept proof test using heterogenous biofilms grown in inner surface of PTFE tubes (ID: 3 mm and OD: 4 mm) by exposing ultrasound up to 50 seconds at 20 Khz and 5 W. The biofilms were grown by circulating 10 ml/min of activated sludge from a local wastewater treatment plant through the tubes for 48 hrs. FIG. 11 showed that immediately after 10 seconds of ultrasound, biofilms under the transducer were dislodged and further application (10 secs pulse with a 30-sec rest) removed all visible biofilms near the treatment area. This result clearly demonstrated that ultrasonication can dislodge significant amounts of callose in phloem within several seconds.

In Huanglongbing (HLB) infected plants, callose inhibits phloem transport by plugging the sieve pores of phloem sieve plates thus contributing to the development of HLB symptoms. This deposition of callose on the sieve plates is problematic for systemic treatment of the phloem limited *Candidatus Liberibacter asiaticus* (CLas) due to the retarded transport of bactericides through the phloem. From our preliminary test, it is anticipated that sonication can dislodge callose integrity in the phloem as the shockwave penetrates the tissue within 5 mins, thus facilitating bactericide diffusion. Phloem is relatively a soft tissue in comparison to the xylem and therefore application of ultrasound with optimized intensity and surface coverage should selectively affect the phloem and bypass the xylem. Disintegration of callose and CLas aggregates in the phloem will create channels for water percolation so that the bactericides can be effectively delivered to treat CLas.

Example 5

Microneedle Devices Adaptable for Attachment to Plant

Penetration Device: The design parameters of the adaptable microneedle penetration device are as follows: (i) 300-500 microneedles are able to penetrate the trunk of a tree simultaneously; (ii) the inner surface of the device is able to adjust its shape such that all attached microneedles can penetrate the trunk with an approximately uniform depth (2.5-3 mm), adapting to the varying shape of trunks and their circumferences; (iii) microneedles should be roughly maintained perpendicular to the surface of the trunk during the penetration process and (iv) a passive mechanism is preferred to lower the development, manufacturing, and operation costs.

According to one version shown in FIG. 12, a circular scissor based design is adopted. Microneedles are fixed in a two-layer circular shape structure. The outer layer is made of aluminum or stainless steel and its shape cannot change. The inner layer is an integration of multiple pieces, and soft materials (such as cushions) are added between the inner and outer layers. When the inner layer touches and presses a trunk, it will reshape and adjust according to the shape of the trunk surface, so that all the microneedles can touch the surface of a trunk. If we assume majority of the trunk diameters of citrus trees are in the range of $[d_l, d_u]$ the diameter of the outer layer should be similar to $d_u$ while that of the inner layer should be similar to $d_l$. The inner layer geometry and cushions between these two layers can adjust the coverage of the scissor according to the circumference of a trunk. To achieve the long term objective of a fully autonomous microneedle delivery subsystem, a spring and magnetic-driven mechanism will be used. As shown in FIG. 12, when the power is off, the spring will keep the scissor open; while when the power is on, the magnets will close the scissor.

Patch Wrap Device: After the trunk penetration via the microneedle penetration device is achieved, bactericide can be delivered to the phloem using pressurized microjet spray, and then a wet-pad will wrap around the trunk area having micro-holes.

In one embodiment, as shown in FIG. 12, a wrap device is shown on the right that is similar to the microneedle penetration device. The difference is at the inner layer, where wetpads are provided on each of the opposing semi-arcuate members. Once the wrap covers the treated area, the device will close, and the wrap and/or opposing members of the device will be secured by Velcro. This device may also be activated using magnets. To reduce the labor cost, ten to a dozen wet-pads may be on the device, so that multiple trees can be treated before new wet-pads need to be reloaded by the operator.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

What is claimed is:

1. A system for delivering a therapeutic composition to an interior tissue of a crop plant, the system comprising:
    a first device comprising a plurality of microneedles for application to an effective area of the crop plant to introduce pores into the effective area of the crop plant; and
    a second device comprising an amount of the therapeutic composition, wherein administration of the therapeutic composition to the pores of the crop plant delivers the therapeutic composition to interior tissues of the crop plant, wherein the first device optionally comprises a substrate comprised of a flexible material onto which the plurality of microneedles is attached or integrated, wherein the first device optionally comprises an attachment mechanism associated therewith to hold the first device on the crop plant, and wherein the first device comprises a roller onto which the plurality of microneedles are positioned.

2. The system of claim 1, wherein the therapeutic composition comprises bactericide, fungicide, insecticide, peptides, si-RNA, biostimulant, fertilizer, nutrient, microbubble, bacteriophage and DNA.

3. The system of claim 1, wherein the second device is in fluid communication with the plurality of microneedles such that the therapeutic composition is delivered through the plurality of microneedles to phloem of the crop plant.

4. The system of claim 3, wherein the second device comprises a pressurized component to deliver the therapeutic composition to the phloem of the crop plant, wherein the pressurized component optionally comprises one or more valves, wherein the pressurized component is configured to deliver the therapeutic composition at a sufficient pressure to overcome a positive pressure in the phloem.

5. The system of claim 1, wherein the second device comprises a second substrate, said second substrate comprising the therapeutic composition, and, optionally, an attachment device, such that association of the second substrate with the effective area having pores delivers the therapeutic composition to interior tissue of the crop plant, wherein the interior tissues comprises phloem and/or xylem.

6. The system of claim 1, further comprising a probe configured to deliver ultrasound energy to the effective area.

7. The system of claim 1, wherein the second device comprises an attachment mechanism to hold the second device to the crop plant.

8. The system of claim 1, wherein the plurality of microneedles are 1-5 mm long and are 300-1000 micrometers wide.

9. The system of claim 1 wherein the plurality of the microneedles are hollow.

10. The system of claim 9, wherein the first device and second device are associated such that therapeutic composition in the second device flows through the hollow microneedles.

11. The system of claim 1, wherein the plurality of microneedles are solid.

* * * * *